Jan. 6, 1925.　　　　　　　　　　　　　　　　1,521,954
L. F. HYMEL
TRANSMISSION GEAR LEVER LOCK
Filed June 11, 1923　　　3 Sheets-Sheet 1
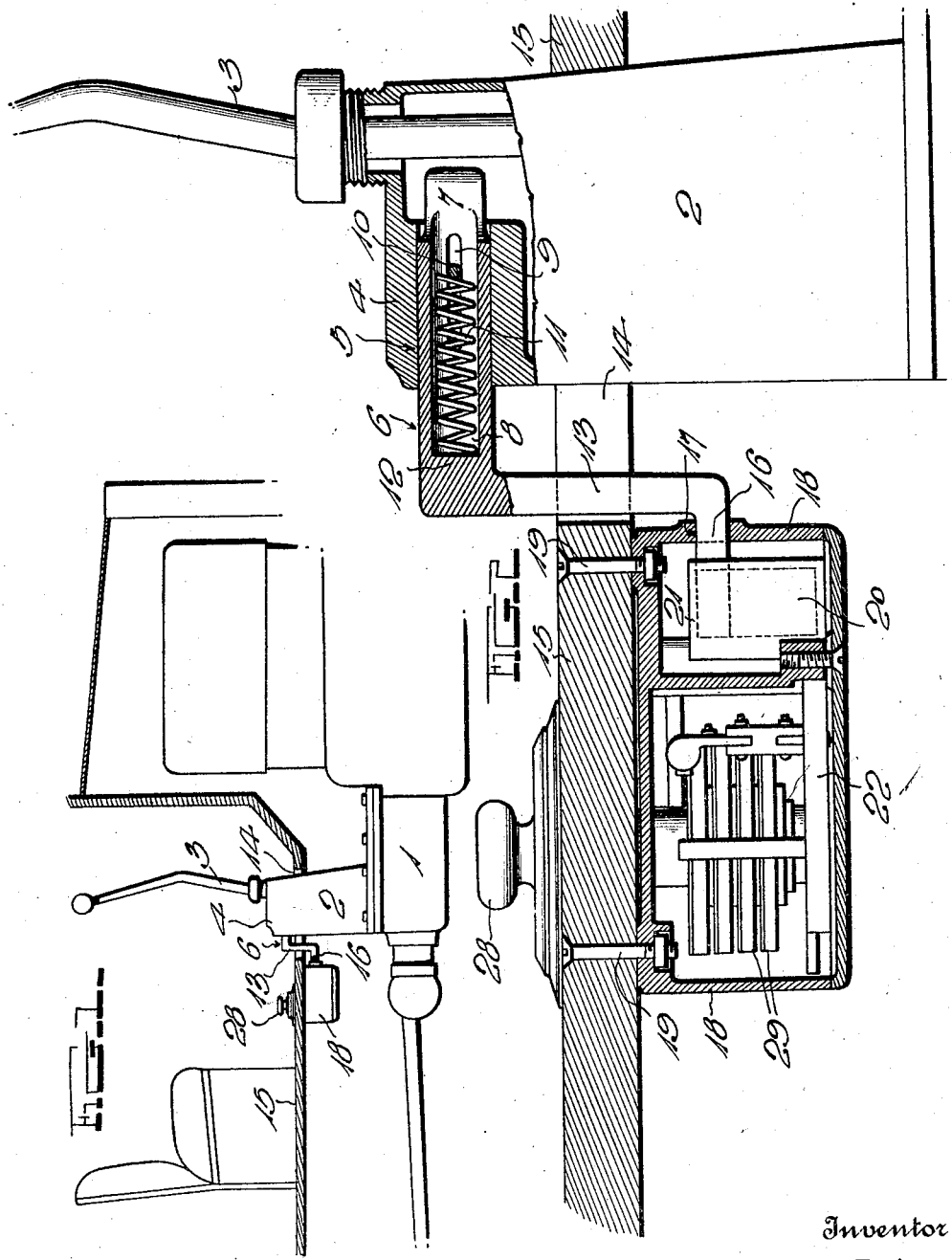
Inventor
LAEONCE F. HYMEL
Witness
H. Woodard
By H. B. Wilson &co
Attorneys

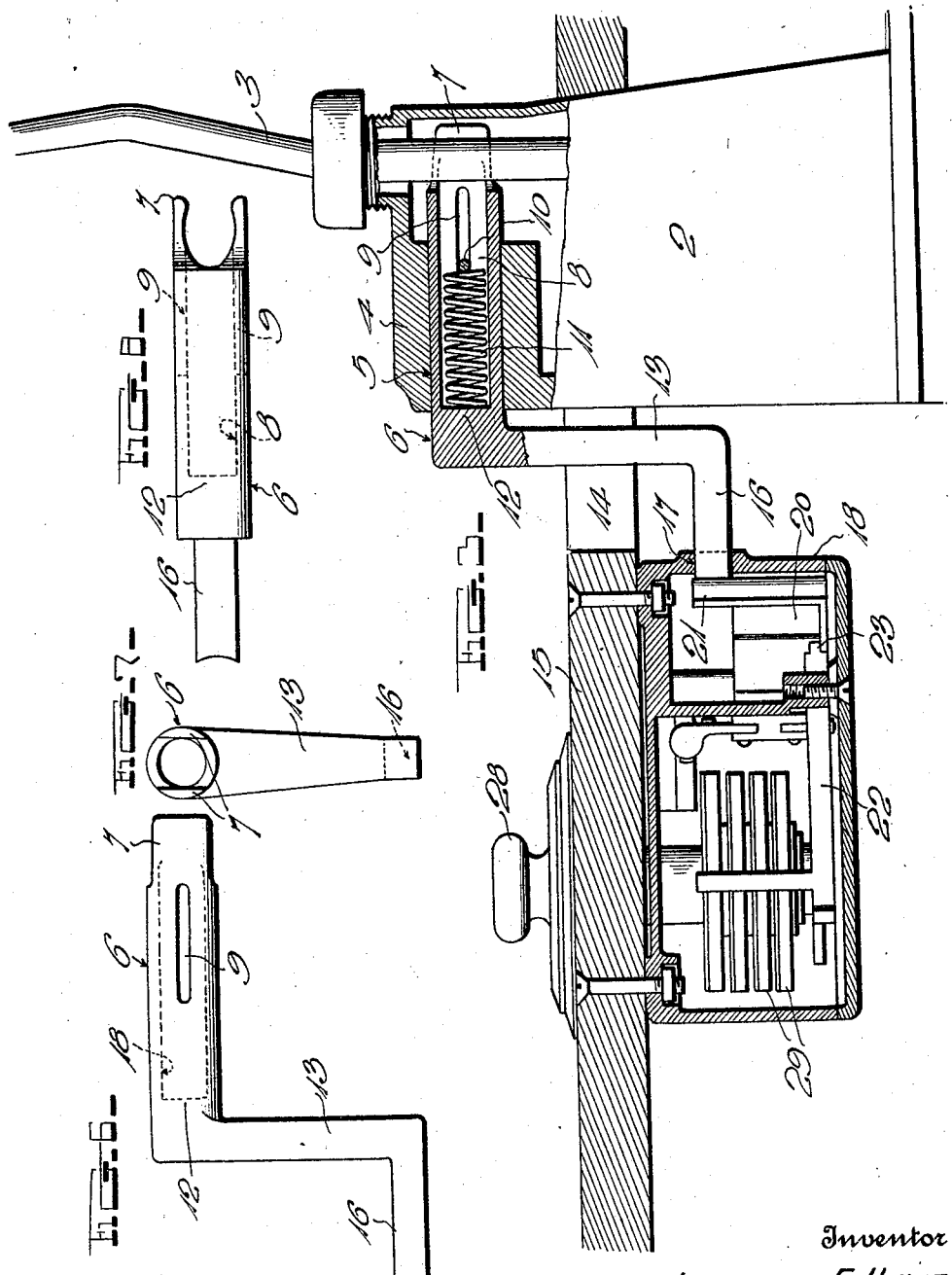

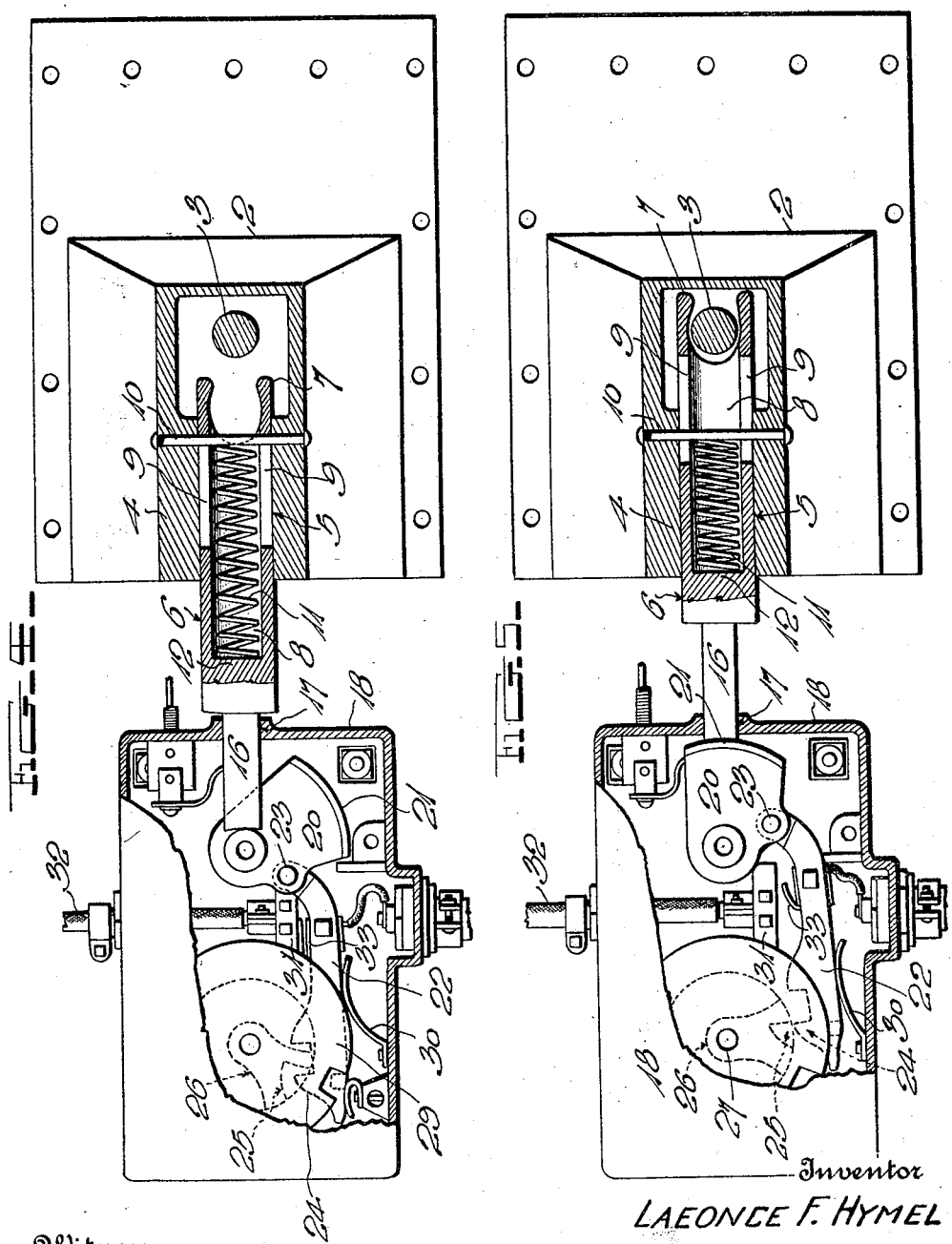

Patented Jan. 6, 1925.

1,521,954

UNITED STATES PATENT OFFICE.

LAEONCE F. HYMEL, OF NEW ORLEANS, LOUISIANA.

TRANSMISSION-GEAR-LEVER LOCK.

Application filed June 11, 1923. Serial No. 644,738.

*To all whom it may concern:*

Be it known that I, LAEONCE F. HYMEL, a citizen of the United States, residing at New Orleans, in the parish of Orleans and State of Louisiana, have invented certain new and useful Improvements in Transmission-Gear-Lever Locks; and I do declare the following to be a full, clear, and exact description of the invention, such as will enable others skilled in the art to which it appertains to make and use the same.

My invention relates to improvements in locks for automobiles and other motor driven vehicles having transmission gearing and a controlling lever therefor.

One object of the invention is to provide novel means under the control of a single locking mechanism for holding the gear lever against operation and for breaking an ignition or other circuit of the vehicle motor, thus positively preventing a car from being operated.

Another object of the invention is to provide an improved form of locking bolt for holding the gear shifting lever against movement to an operative position.

With the foregoing in view, the invention resides in the novel subject matter hereinafter described and claimed, the description being supplemented by the accompanying drawings.

Figure 1 is a small side elevation partly in section, showing the application of my invention to an automobile.

Figure 2 is an enlarged vertical longitudinal sectional view, partly in elevation, the locking mechanism being released.

Figure 3 is a view similar to Fig. 2 but showing the manner in which the gear shifting lever is locked against movement.

Figure 4 is a horizontal sectional view partly in elevation showing the relation of parts existing in Fig. 2.

Figure 5 is a view similar to Fig. 4 but showing the relation of parts obtaining in Fig. 3.

Figure 6 is a side elevation of the locking bolt.

Figure 7 is an end view thereof.

Figure 8 is a top plan view of the bolt.

In the drawings above briefly described, the numeral 1 designates the transmission casing of an automobile having the usual upstanding projection 2 into which the well known gear shifting lever 3 passes. In the present showing, the rear portion of the extension 2 is thickened at its upper end as indicated at 4 and is provided with a horizontal bore 5, thus forming a guide for a horizontal lever locking bolt 6 which is slidable in said bore, the front end of said bolt 6 being forked as indicated at 7 to receive the lower end portion of the lever 3 and prevent lateral tilting of said lever into operative engagement with the shifting rods for the transmission gears within the casing 1. The bolt 6 is preferably of cylindrical form and is provided with a blind bore 8 opening through its front end, opposed sides of said bolt being provided with longitudinal slots 9 which open into the bore. A pin 10 passes through these slots, through the thickened portion 4 of the extension 2 and across the bore 8 and forms an abutment against which a coiled spring 11 thrusts, said spring being located within the bore 8 and acting against the closed end 12 thereof, for the purpose of normally retracting the bolt. When this bolt is forced forwardly however and locked by the means hereinafter described, the lever 3 is positively held against movement to an operative position.

In the preferred form of construction, the rear end of the bolt 6 is provided with a rigid extension 13 which may well be integral therewith, said extension projecting downwardly from the bolt for passage through a slot 14 in the vehicle floor 15 and terminating in a rearwardly projecting horizontal end 16. The end 16 passes slidably through an opening 17 in the front end of a lock casing 18 positioned under the floor 15 and preferably secured to the latter by bolts or the like 19. Within the casing 18 is a pivoted tumbler 20 having a lateral arcuate flange 21 which is adapted to abut the end 16 of the bolt extension 13 when the bolt is projected as shown in Figs. 3 and 5. Thus, the bolt is held in operative position, but when the tumbler 20 is turned to the released position illustrated in Figs. 2 and 4, the end 16 of the bolt extension is cleared by the flange 21 and consequently the spring 11 may act to retract the bolt.

For operating the tumbler 20, I provide a mechanism which is preferably a duplicate of that disclosed in my U. S. Patent No. 1,469,651, dated October 2, 1923. Hence, this mechanism will be very briefly described.

A longitudinally movable arm 22 is pivoted at 23 to the tumbler 20 and is provided with a nose 24 cooperable with a notch 25 in an actuator 26 mounted on a shaft 27. A suitable operating knob 28 is provided for the actuator 27, but this knob can be moved in an operative manner, only when a plurality of tumbler disks 29 in the casing are set at a predetermined position, at which time the nose 24 may engage the notch 25, under the influence of the spring 30. The locking mechanism is of the permutation character in order that it cannot be operated by unauthorized persons.

At 31, a stationary contact is shown in the casing 18 and connected to a wire 32. This contact 31 is co-operable with a second contact 33 carried by the arm 22 for completing a necessary circuit of the vehicle motor when the locking mechanism is in a position to release the bolt 6, as seen in Fig. 4. When the bolt is projected however, the contact 33 is separated from the contact 31 and hence the circuit is broken to throw the motor out of operation.

All parts of the lock mechanism not described, are fully disclosed in the pending application above referred to and constitute no part of the present invention, except in the association which they bear to the new structural features.

From the foregoing, it will be seen that by simply pushing forwardly upon the bolt 6, when the lever 3 is in neutral, the tumbler 20 may be moved to an operative position as seen for instance in Fig. 5, thus effectively locking the bolt against retraction and consequently preventing movement of the lever. Simultaneously with this operation, contact is broken between the members 31 and 33 and the motor is consequently placed in an inoperative condition. When the locking mechanism is operated to release the tumbler 20 however, the contact 33 engages the contact 31 and the circuit is completed, simultaneously with release of the bolt 6.

Excellent results have been obtained from the details disclosed and they may therefore be followed if desired, but it is to be understood that the present disclosure is principally for illustrative purposes, and that within the scope of the invention as claimed, numerous minor changes may be made.

I claim:

1. In combination with a vehicle transmission casing having an upstanding portion through which the transmission gear shifting lever passes, said casing portion extending above the vehicle floor and having a horizontal guide opening near its upper end; a horizontal lever locking bolt slidable in said guide opening and having a rigid extension passing downwardly through an opening in the floor and then extending horizontally under the latter, a lock casing under the floor into which said horizontal portion of said rigid extension passes, and means in said casing for engaging said horizontal extension portion and locking said bolt in operative position.

2. A transmission lever lock comprising a casing having an opening, a bolt in a plane above said casing for engagement with the lever, said bolt having a rigid extension projecting downwardly from the bolt and then extending horizontally away from the bolt through said opening, and means in said casing co-operable with the end of said extension for locking the same in operative position.

In testimony whereof I have hereunto affixed my signature.

LAEONCE F. HYMEL.